United States Patent
Nguyen et al.

(10) Patent No.: US 12,405,428 B2
(45) Date of Patent: Sep. 2, 2025

(54) CAP

(71) Applicant: Fujikura Ltd., Tokyo (JP)

(72) Inventors: Thao Thi Thanh Nguyen, Chiba (JP); Shigeo Takahashi, Chiba (JP)

(73) Assignee: Fujikura Ltd., Tokyo (JP)

(*) Notice: Subject to any disclaimer, the term of this patent is extended or adjusted under 35 U.S.C. 154(b) by 285 days.

(21) Appl. No.: 18/024,571

(22) PCT Filed: Jun. 7, 2021

(86) PCT No.: PCT/JP2021/021530
§ 371 (c)(1),
(2) Date: Mar. 3, 2023

(87) PCT Pub. No.: WO2022/107366
PCT Pub. Date: May 27, 2022

(65) Prior Publication Data
US 2023/0333326 A1  Oct. 19, 2023

(30) Foreign Application Priority Data
Nov. 17, 2020  (JP) ................. 2020-191085

(51) Int. Cl.
*G02B 6/38* (2006.01)
(52) U.S. Cl.
CPC ................. *G02B 6/3849* (2013.01)
(58) Field of Classification Search
None
See application file for complete search history.

(56) References Cited

U.S. PATENT DOCUMENTS

| | | | | |
|---|---|---|---|---|
| 5,214,730 A | * | 5/1993 | Nagasawa | G02B 6/389 385/71 |
| 9,823,425 B2 | * | 11/2017 | Xiao | G02B 6/3849 |
| 10,175,427 B2 | | 1/2019 | Cloud et al. | |
| 10,209,457 B2 | * | 2/2019 | Watanabe | G02B 6/3849 |
| 11,209,600 B2 | * | 12/2021 | Petersen | G02B 6/3893 |
| 2004/0072454 A1 | | 4/2004 | Nakajima et al. | |

(Continued)

FOREIGN PATENT DOCUMENTS

| CN | 101523263 A | 9/2009 |
|---|---|---|
| CN | 203799060 U | 8/2014 |

(Continued)

OTHER PUBLICATIONS

International Search Report issued in corresponding International Application No. PCT/JP2021/021530, dated Aug. 31, 2021 (3 pages).

*Primary Examiner* — Jerry Rahll
(74) *Attorney, Agent, or Firm* — Osha Bergman Watanabe & Burton LLP

(57) ABSTRACT

A cap attachable to an optical connector including a ferrule and a housing that slidably houses the ferrule, includes: a body part configured to attach to the optical connector and configured to cover a connecting end face of the ferrule projecting from the housing and a side surface of the ferrule projecting from the housing; a housing contact part configured to contact the housing inside the body part; and a ferrule contact part configured to contact the side surface of the ferrule in a state where the housing contact part is in contact with the housing.

7 Claims, 12 Drawing Sheets

(56) References Cited

U.S. PATENT DOCUMENTS

| | | | |
|---|---|---|---|
| 2006/0285814 A1* | 12/2006 | Brown | G02B 6/3849 |
| | | | 385/139 |
| 2011/0013876 A1 | 1/2011 | Marcouiller et al. | |
| 2011/0188813 A1* | 8/2011 | Marcouiller | G02B 6/3849 |
| | | | 385/139 |
| 2014/0321814 A1 | 10/2014 | Chen et al. | |
| 2018/0095226 A1* | 4/2018 | Watanabe | G02B 6/3885 |
| 2018/0267252 A1 | 9/2018 | Takano et al. | |

FOREIGN PATENT DOCUMENTS

| | | |
|---|---|---|
| CN | 208737044 U | 4/2019 |
| JP | H04235508 A | 8/1992 |
| JP | H10160972 A | 6/1998 |
| JP | 2007102114 A | 4/2007 |
| JP | 2013068976 A | 4/2013 |
| JP | 2018060040 A | 4/2018 |

* cited by examiner

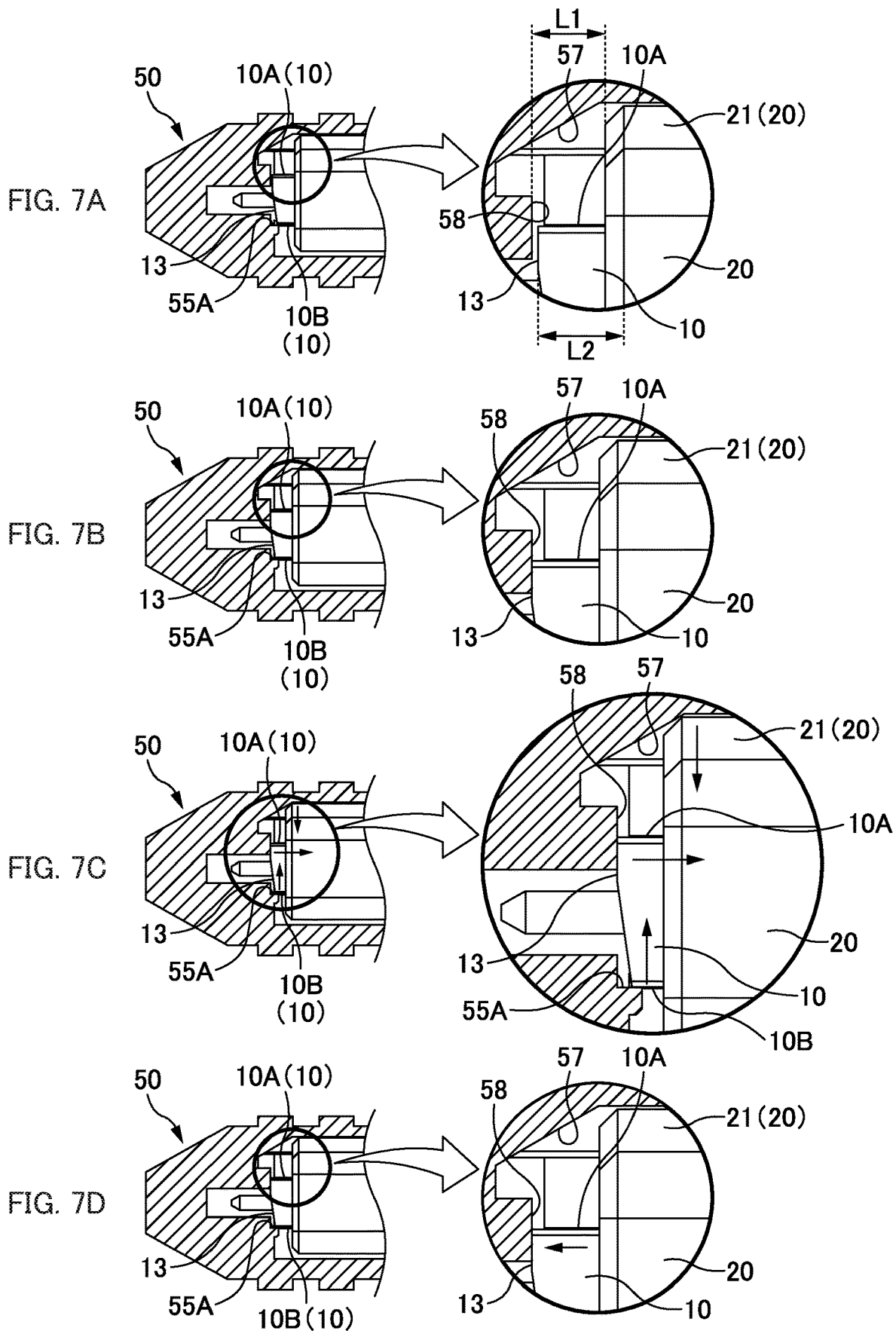

CAP

TECHNICAL FIELD

The present disclosure relates to a cap to be used for an optical connector.

BACKGROUND

PTL 1 discloses an optical connector with a ferrule floating inside a housing. Also, as an example of the optical connector with a ferrule floating inside a housing, an MPO connector (F13 multi-core optical fiber connector defined in JIS C5982), for instance, has been known.

PATENT LITERATURE

[PTL 1] Japanese Patent Application Publication No. Hei 4-235508

In order to make a ferrule float inside a housing, a gap needs to be placed between the ferrule and the housing. However, the position of the ferrule relative to the housing may vary due to the gap between the ferrule and the housing. Moreover, if the optical connector is connected to a counterpart optical connector with the ferrule situated at an inappropriate position relative to the housing, the optical axes of the optical fibers are misaligned. This may increase the transmission loss of optical signals.

SUMMARY

One or more embodiments of the present invention adjust the position of a ferrule of an optical connector to an appropriate position.

According to one or more embodiments of the invention, a cap attachable to an optical connector including a ferrule and a housing that houses the ferrule slidably, the cap comprises: a body part configured to attach to the optical connector, and configured to cover a connecting end face of the ferrule projecting from the housing and a side surface of the ferrule projecting from the housing; a housing contact part configured to contact the housing inside the body part; and a ferrule contact part configured to contact the side surface of the ferrule in a state where the housing contact part is in contact with the housing.

Other features of the present invention will become apparent from the contents of the description and drawings to be set forth later.

According to the present invention, it is possible to adjust the position of a ferrule of an optical connector to an appropriate position.

BRIEF DESCRIPTION OF THE DRAWINGS

FIGS. 7A to 7D are explanatory views of states inside the cap 50 at the time of attaching the cap.

DETAILED DESCRIPTION

Embodiments representing some examples of the invention of the present application will be described based on the contents of the description and drawings set forth below.

First Embodiments

Figure 1A:
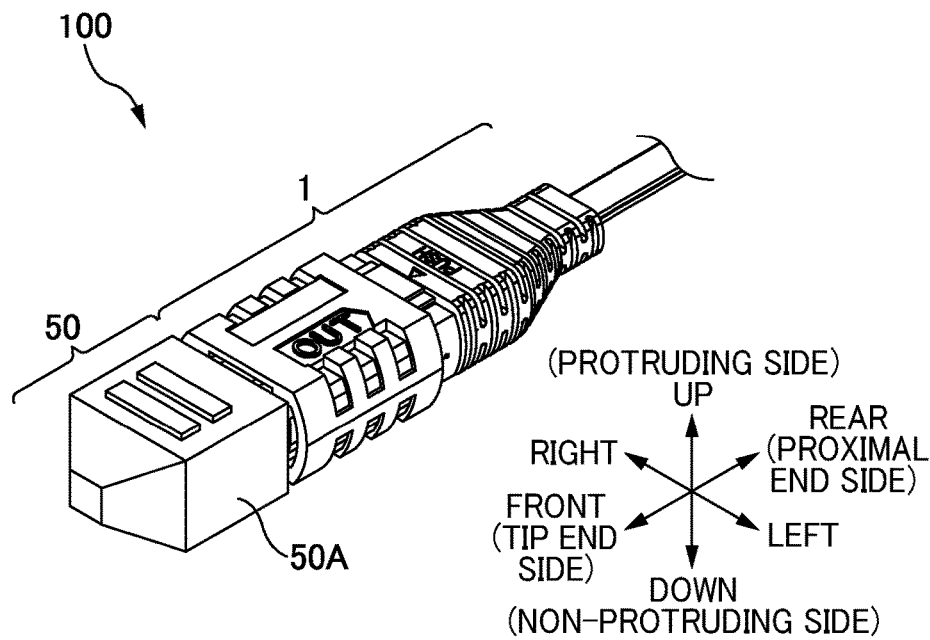
FIG. 1A is a perspective view of a capped optical connector 100.
Figure 1B:
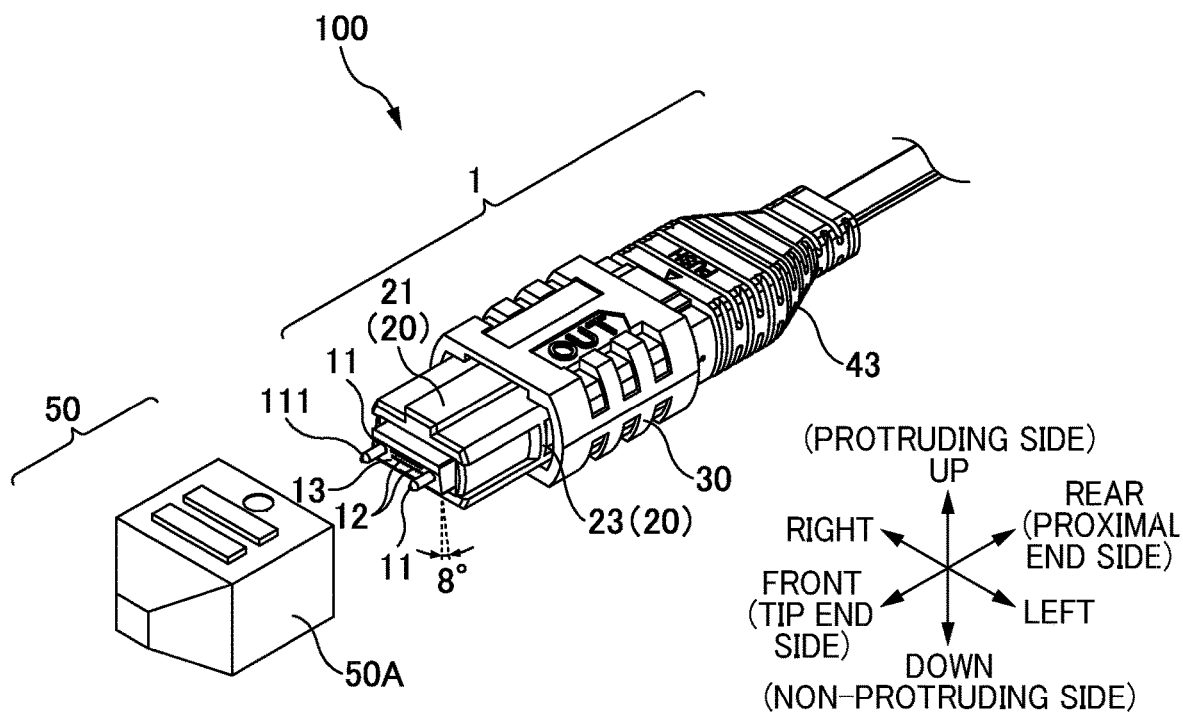
FIG. 1B is a perspective view of a state where a cap 50 is detached from an optical connector 1.
Figure 2:
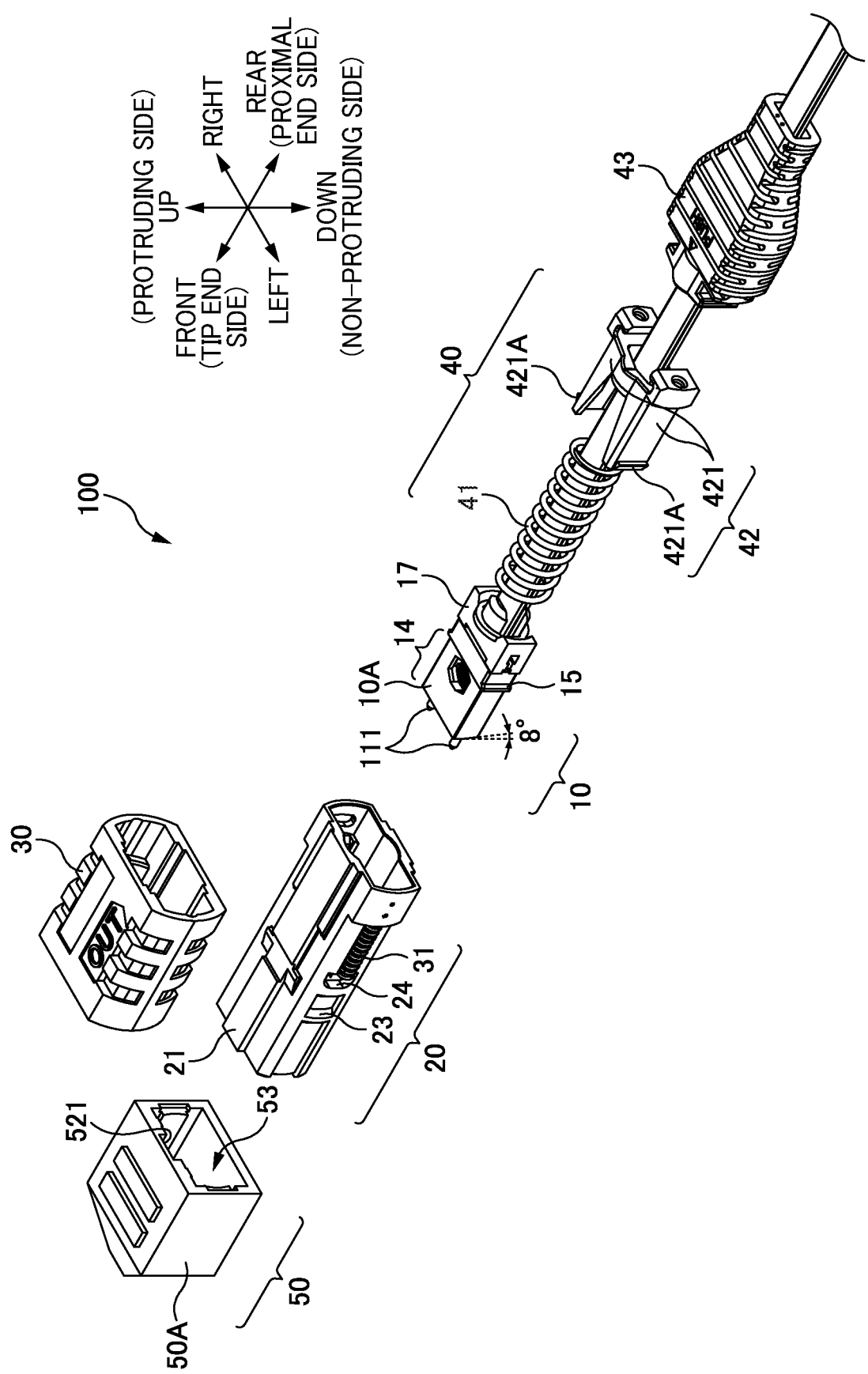
FIG. 2 is an exploded view of the capped optical connector 100.

FIG. 1A is a perspective view of a capped optical connector 100. FIG. 1B is a perspective view of a state where a cap 50 is detached from an optical connector 1. FIG. 2 is an exploded view of the capped optical connector 100.

In the following description, directions are defined as illustrated in FIG. 1B. Specifically, the direction of attaching/detaching the cap 50 to/from the optical connector 1 will be referred to as "front-rear direction", with "front" being the cap 50 side relative to the optical connector 1 and "rear" being the opposite side to the front. Note that the front-rear direction will also be referred to as "attaching/detaching direction". Also, since a ferrule 10 is slidable relative to a housing 20 in the front-rear direction, the front-rear direction will be referred to as "slide direction" as well. Moreover, the front side will also be referred to as "tip end side" and the rear side will also be referred to as "proximal end side". Furthermore, the direction in which a pair of guide pins 111 (or guide holes 11) are arranged will be referred to as "left-right direction", with "right" being the right side as viewed from the rear side toward the front side and "left" being the opposite side. Note that the left-right direction will also be referred to as "width direction". Moreover, the direction perpendicular to the front-rear direction and the left-right direction will be referred to as "up-down direction", with "up" being the side where a key 21 of the optical connector 1 is located and "down" being the opposite side to the side with the key 21. Note that an end face 13 of the ferrule 10 in one or more embodiments is inclined such that a part closer to the upper side (the key 21 side) protrudes farther toward the front side (tip end side; the side toward a counterpart connector not illustrated) (described later). For this reason, the upper side will also be referred to as "protruding side", and the lower side will also be referred to as "non-protruding side".

The capped optical connector 100 in one or more embodiments has the optical connector 1 and the cap 50.

<Configuration of Optical Connector 1>

The optical connector 1 in one or more embodiments is an MPO (Multifiber Push-On) optical connector defined in JIS C 5982 or IEC 61754-7. Note that the optical connector is not limited to an MPO optical connector and may be another optical connector. The optical connector 1 is an optical connector capable of collectively connecting a plurality of optical fibers. The optical connector 1 has the ferrule 10, the housing 20, and a floating mechanism 40.

The ferrule 10 is a member that holds end parts of optical fibers. The ferrule 10 in one or more embodiments is an MT connector (MT ferrule) defined in JIS C 5981 or IEC 61754-5. The ferrule 10 has the pair of guide holes 11, a plurality of fiber holes 12, and the end face 13.

The guide holes 11 are holes to be inserted the guide pins 111. When the optical connector 1 is a male type, the guide pins 111 are pre-attached to the guide holes 11 such that end parts of the guide pins 111 project from the guide holes 11. When the optical connector 1 is a female type, the guide pins 111 of the counterpart connector will be inserted in the guide holes 11. The guide holes 11 are parts forming positioning parts together with the guide pins 111. The guide holes 11 (and the guide pins 111) are placed along the front-rear direction. The pair of guide holes 11 (and guide pins 111) are aligned in the width direction. The pair of guide holes 11 (and guide pins 111) are placed with the plurality of fiber holes 12 sandwiched therebetween in the width direction.

The fiber holes 12 are holes to insert end parts of optical fibers. The end part of an optical fiber is fixed in each fiber hole 12. Each fiber hole 12 is formed along the front-rear direction. The plurality of fiber holes 12 are placed side by side in the width direction. Here, the plurality of fiber holes 12 aligned in the width direction are placed in 2 upper and lower arrays, and each array has 12 fiber holes 12 placed side by side in the width direction. Note that the number of arrays of fiber holes 12 aligned in the width direction may be one or two or more. As will be described later, taking into account the amount of misalignment due to the gap between the guide pins 111 and the guide holes 11, the fiber holes 12 in one or more embodiments are placed to be offset in the up-down direction by a predetermined offset amount.

The end face 13 is an end face on the tip end side of the ferrule 10 (front side; the side toward the counterpart connector not illustrated). The end face 13 is a connecting end face to be connected to the ferrule of the counterpart connector. In one or more embodiments, the end face 13 is inclined (the end face 13 is an inclined surface). Specifically, the end face 13 is inclined at about 8 degrees to a plane perpendicular to the optical axes of the optical fibers. The end face 13 is formed by being obliquely ground together with the end faces of the optical fibers inserted in the fiber holes 12. In one or more embodiments, the end face 13 is inclined such that a part thereof closer to the upper side (the key 21 side) protrudes farther toward the tip end side (front side; the counterpart connector side).

The ferrule 10 has a body part 14 and rim parts 15. The rim parts 15 are parts protruding outward from side surfaces of the body part 14 (flange parts). The rim parts 15 contact protrusion parts 22 on the housing 20 to thereby prevent the ferrule 10 from coming out to the front side.

An end part of the ferrule 10 (an end part on the tip end side; front part) protrudes from an opening of the housing 20. The end face 13 therefore protrudes from the housing 20. Also, the side surfaces of the ferrule 10 on the tip end side protrude from the housing 20 as well. Note that the side surfaces of the ferrule 10 are surfaces forming the peripheral surface of the body part 14, and include the upper surface, lower surface, right surface, and left surface of the ferrule 10 in the drawings. The ferrule 10 is slidable relative to the housing 20 in the front-rear direction (slide direction), and the side surfaces of the ferrule 10 are formed as parallel surfaces to the front-rear direction (slide direction). In one or more embodiments, the end face 13 is inclined such that, of the side surfaces of the ferrule 10, the upper surface protrudes from the housing 20 more than the lower surface (the surface opposite to the upper surface). In the following description, the side surface of the ferrule 10 on the protruding side (the upper surface herein) will also be referred to as "first side surface 10A", and the side surface of the ferrule 10 on the non-protruding side (the lower surface herein) will also be referred to as "second side surface 10B".

A pin clamp 17 is placed on the proximal end side (rear side) of the ferrule 10. When the optical connector 1 is a male type as in one or more embodiments, the pin clamp 17 holds the proximal ends (rear ends) of the guide pins 111. Moreover, when the optical connector 1 is a male type, the guide pins 111 are placed to penetrate through the guide holes 11 in the ferrule 10, and the tip ends of the guide pins 111 project from the end face 13.

The housing 20 is a cylindrical housing member. The housing 20 is a member that houses the ferrule 10 and the floating mechanism 40. An end part of the ferrule 10 protrudes from an opening of the housing 20, and the end face 13 of the ferrule 10 protrudes from the housing 20. The housing 20 houses the ferrule 10 such that it can slide, and houses the ferrule 10 such that it is retractably pushed toward the tip end side (front side). On the inner wall surface of the housing 20, the protrusion parts 22 (see FIG. 6B) are located protruding inward. The protrusion parts 22 contact the rim parts 15 of the ferrule 10 to thereby prevent the ferrule 10 from coming out to the front side. Engagement parts 23 are located in side surfaces of the housing 20. The engagement parts 23 are parts to hook claw parts of a member to which the optical connector 1 is to be connected (e.g., claw parts of an optical adapter), and are parts serving as mechanical reference positions on the optical connector 1.

A coupling 30 is placed around the outer periphery of the housing 20. The coupling 30 is located so as to be movable relative to the housing 20 in the front-rear direction. Springs 31 are placed between the coupling 30 and the housing 20. The springs 31 push the coupling 30 relative to the housing 20 toward the front side. The coupling 30 is a part to be operated by an operator at the time of pulling out the optical connector 1 (operated to be moved relative to the housing 20 toward the rear side).

The floating mechanism 40 is a mechanism that pushes the ferrule 10 toward the tip end side (front side). The floating mechanism 40 has a spring 41 and a spring push 42. The spring 41 is an elastic member (biasing member) that biases the ferrule 10. The spring 41 is housed in the housing 20 in a compressively deformed state between the ferrule 10 (specifically the pin clamp 17) and the spring push 42. The spring push 42 is a member by which the spring 41 is housed in the housing 20 in the compressed state. The spring push 42 has a pair of arm parts 421. The spring 41 is housed in the space between the pair of arm parts 421. In the front ends of the arm parts 421, claw parts 421A are formed facing outward. The spring push 42 can be attached to the housing 20 with the spring 41 compressed by hooking the claw parts 421A on window parts 24 in the side surfaces of the housing 20. A boot 43 is attachable to the proximal end side (rear side) of the spring push 42.

Incidentally, in the state where the optical connector 1 is connected to the counterpart connector, the ferrule 10 receives a force from the ferrule of the counterpart connector, so that the ferrule 10 retracts into the housing 20, and the rim parts 15 of the ferrule 10 and the protrusion parts 22 of the housing 20 are separated from each other. When the optical connector 1 is connected to the counterpart connector, the floating mechanism 40 pushes the ferrule 10 toward the ferrule of the counterpart connector with a predetermined force in the state where the rim parts 15 of the ferrule 10 and the protrusion parts 22 of the housing 20 are separated from each other. Note that, in the following description, the state where the rim parts 15 of the ferrule 10 and the protrusion parts 22 of the housing 20 are separated from each other will also be referred to as "floating state".

<Misalignment of Ferrule 10>

Figure 11A:
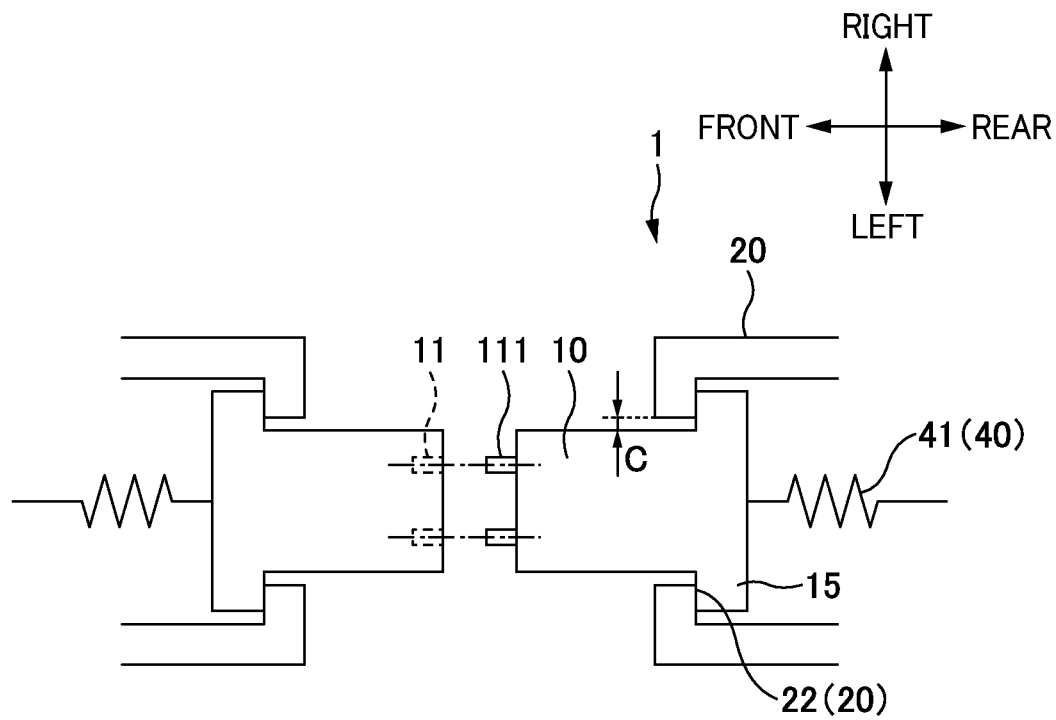
FIGS. 11A and 11B are explanatory views of misalignment of a ferrule 10.
Figure 11B:
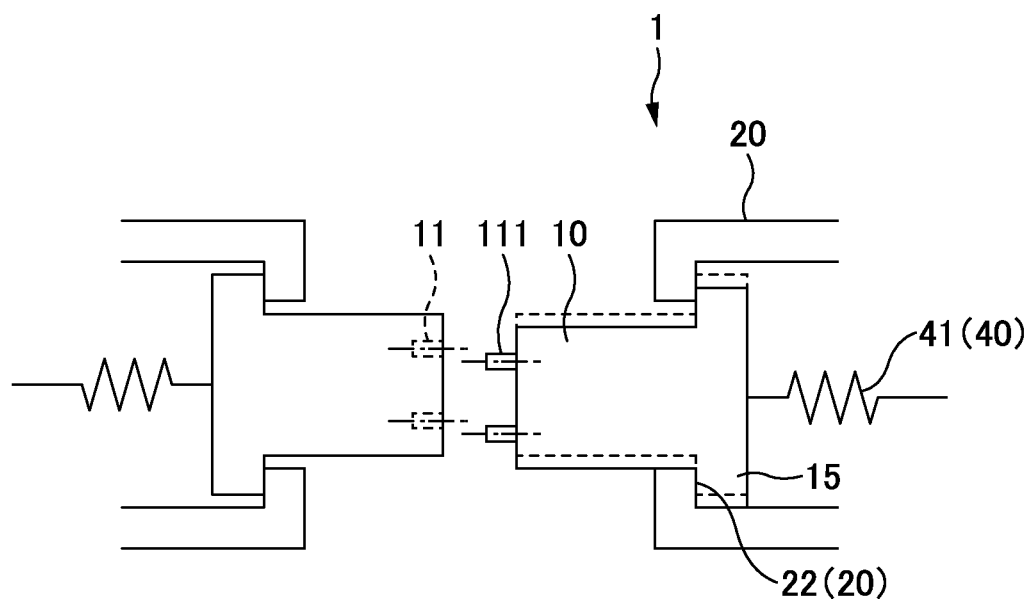

FIGS. 11A and 11B are explanatory views of misalignment of the ferrule 10. FIG. 11A is an explanatory view of a state where the ferrule 10 is placed in the center of the housing 20. FIG. 11B is an explanatory view of a state where the ferrule 10 is misaligned from the center of the housing 20.

As already described, the ferrule 10 is configured to be slidable relative to the housing 20. A gap C is therefore necessary between the ferrule 10 and the housing 20. Note that, due to the presence of this gap C, the position of the ferrule 10 is sometimes displaced to one side in the width direction from the center of the housing 20 as illustrated in FIG. 11B. The position of the ferrule 10 therefore varies in the width direction. Moreover, the variation in the position of the ferrule 10 in the width direction may cause the ferrule to come into abutment with the ferrule of the counterpart connector in the state of being displaced in the width direction as illustrated in FIG. 11B, so that the optical axes of the connected optical fibers are misaligned. This may increase the transmission loss of optical signals. By inserting the guide pins 111 of one ferrule 10 into the guide holes 11 of the other ferrule, the ferrules are positioned relative to each other. Note that there is a gap (described later) between the guide holes 11 and the guide pins 111. Hence, if the ferrules are brought into abutment with each other with the ferrule of one connector displaced from the ferrule of the counterpart connector in the width direction, the optical axes of the connected optical fibers may be misaligned.

As will be described later, in one or more embodiments, the cap 50 is therefore attached to the optical connector 1 to thereby adjust the position of the ferrule 10 to an appropriate position such that the ferrule 10 is located in the center of the housing 20 in the width direction. Note that the appropriate position for the ferrule 10 is not limited to the center of the housing 20. This feature will be described next.

Figure 12A:
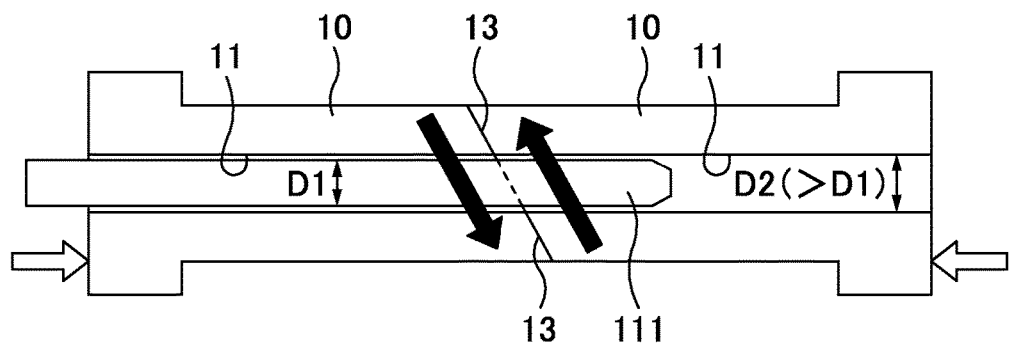
FIG. 12A is an explanatory view of how the ferrule 10 becomes offset.
Figure 12B:
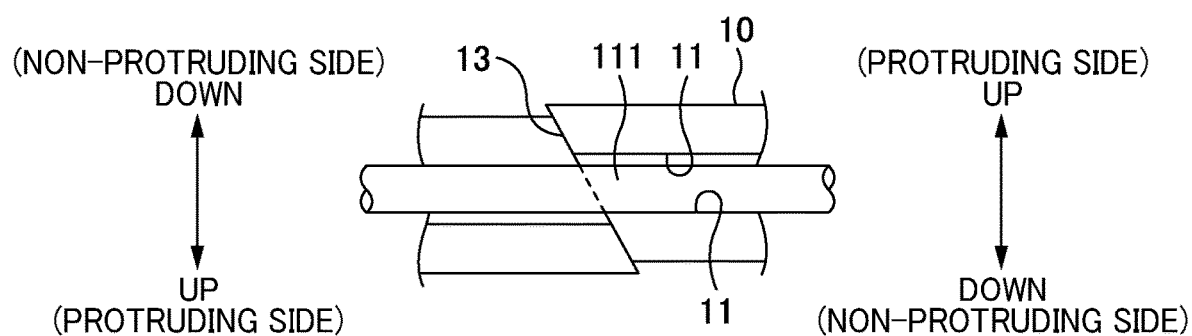
FIG. 12B is an explanatory view of an appropriate position for the ferrule 10.

FIG. 12A is an explanatory view of how the ferrule 10 becomes offset. FIG. 12B is an explanatory view of an appropriate position for the ferrule 10.

As illustrated in FIG. 12A, a diameter D2 of each guide hole 11 is made larger than a diameter D1 of the corresponding guide pin 111 (D2>D1), and a gap is formed between the guide hole 11 and the guide pin 111. Also, each ferrule 10 is pressed against the counterpart ferrule with their inclined surfaces 13 in abutment with each other. As a result, the ferrules 10 becomes displaced so as to slide along the inclined surfaces 13 as indicated by the black arrows in the drawing, so that the ferrules 10 become offset from each other in the up-down direction (the center axes of their guide holes 11 are offset from each other in the up-down direction, as illustrated in FIG. 12B). The fiber holes 12 (not shown in FIG. 12B) of the ferrules 10 are therefore placed at positions taking into account the offset of the ferrules 10 from each other in the up-down direction as illustrated in FIG. 12B. To put it differently, the ferrules 10 are configured such that the optical axes of the optical fibers coincide with each other when the ferrules 10 are in the state illustrated in FIG. 12B. Note that the fiber holes 12 (not shown in FIG. 12B) of the ferrules 10 are placed to be offset from the center axes of the guide holes 11 in the up-down direction by an offset amount corresponding to (D2−D1)/2 (an amount of deformation of the guide pins 111 by the shear stress may further be added to the offset amount).

Meanwhile, when the ferrules 10 are brought into abutment with each other with the center axes of the guide pins 111 and the guide hole 11 coinciding with each other, the ferrules may not become offset from each other in the up-down direction as much as expected due to the frictional force acting between their end faces 13. In this case, the optical axes of the optical fibers become misaligned. This may increase the transmission loss of optical signals.

As will be described later, in one or more embodiments, the cap 50 is therefore attached to the optical connector 1 to thereby adjust the position of the ferrule 10 to an appropriate position such that the ferrule 10 is shifted relative to the housing 20 toward the protruding side of the inclined surface 13 (see FIG. 12B). As described above, the appropriate position for the ferrule 10 is not limited to the center of the housing 20 and may be a position shifted toward the protruding side of the inclined surface 13.

<Configuration of Cap 50>

Figure 3:
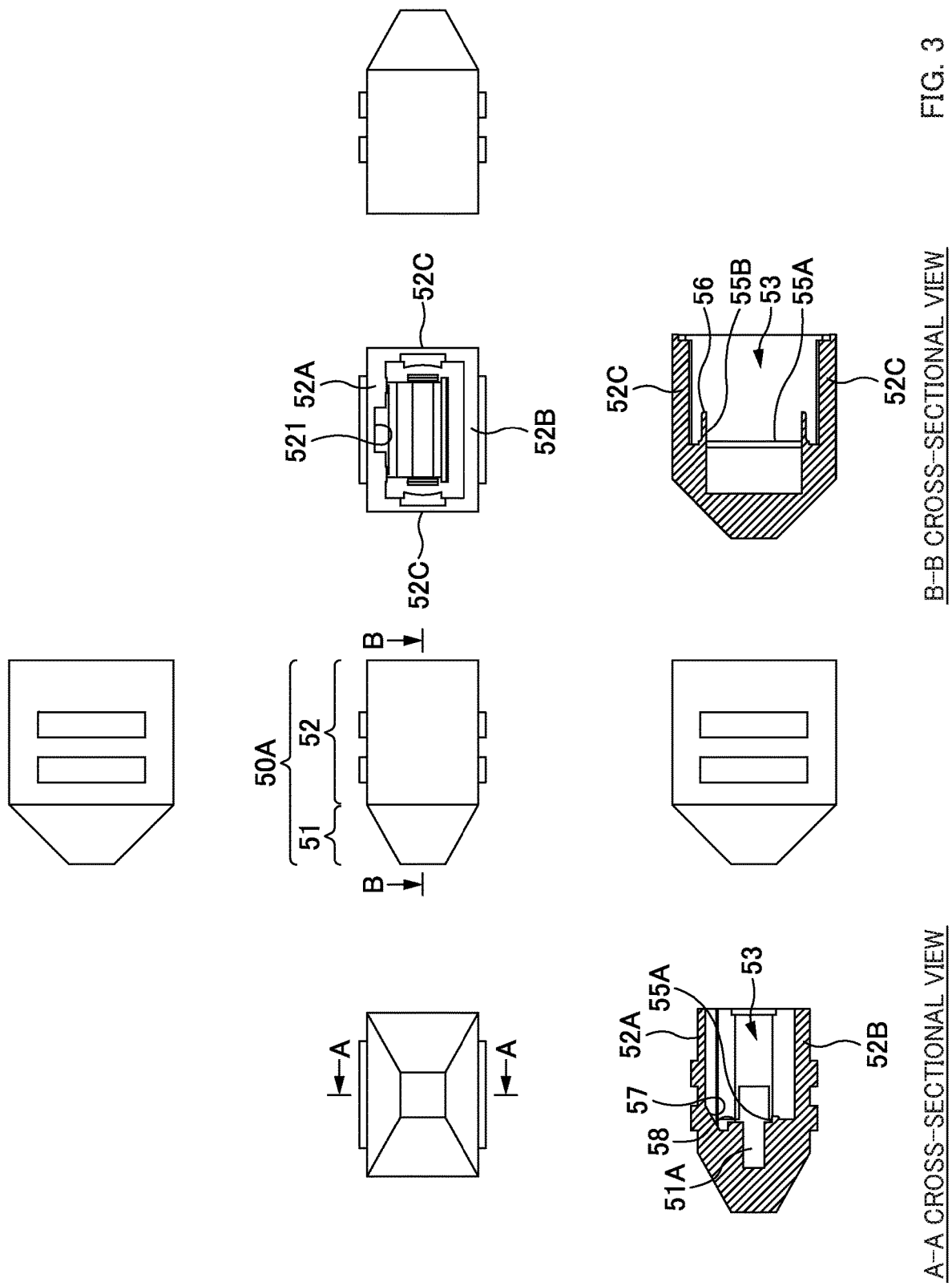
FIG. 3 is a set of orthogonal projections of the cap 50 in several directions.
Figure 4:
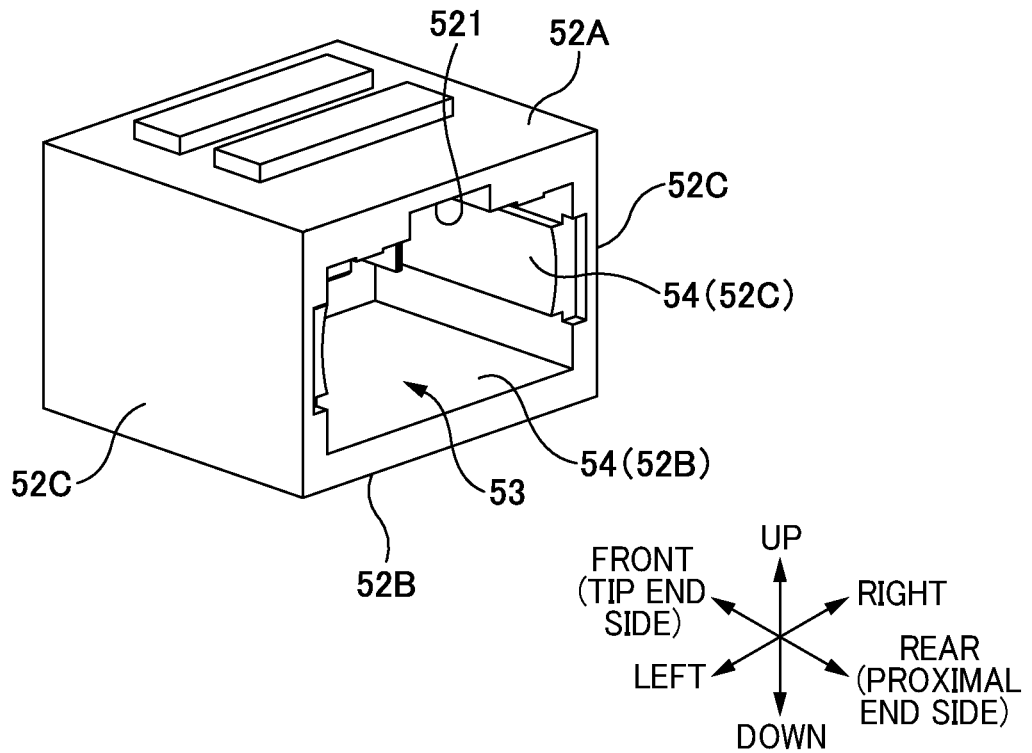
FIG. 4 is a perspective view of the cap 50.
Figure 5A:
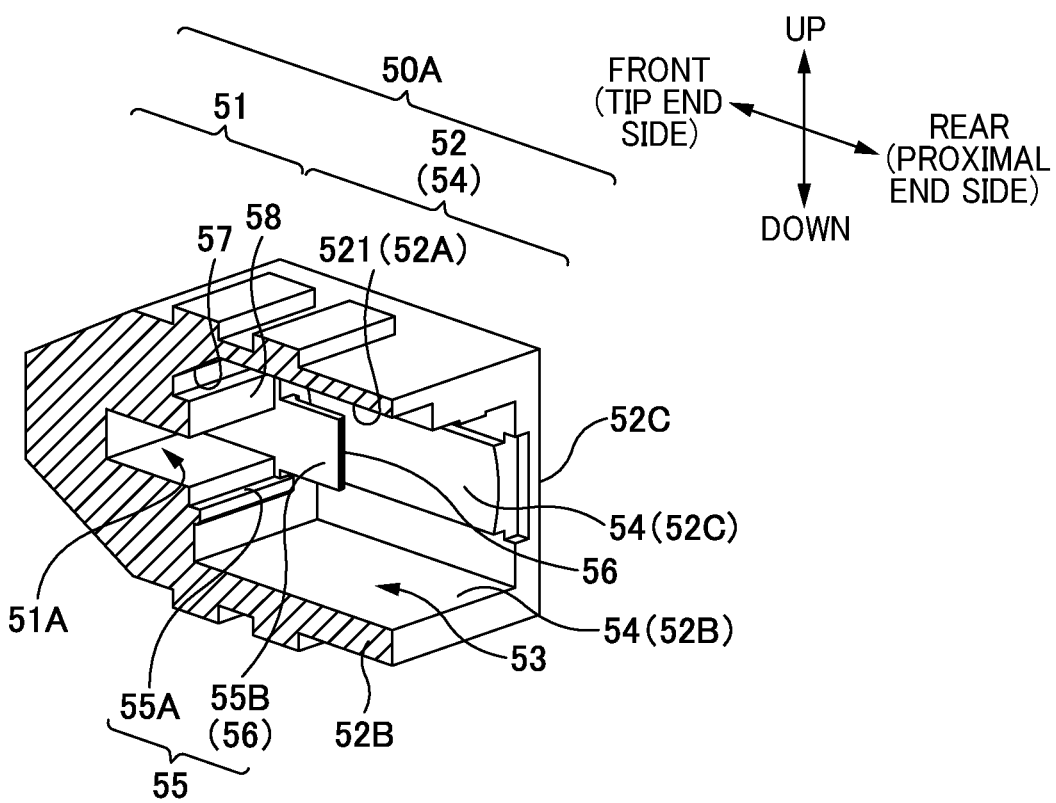
FIGS. 5A and 5B are explanatory views illustrating an internal structure of the cap 50.
Figure 5B:
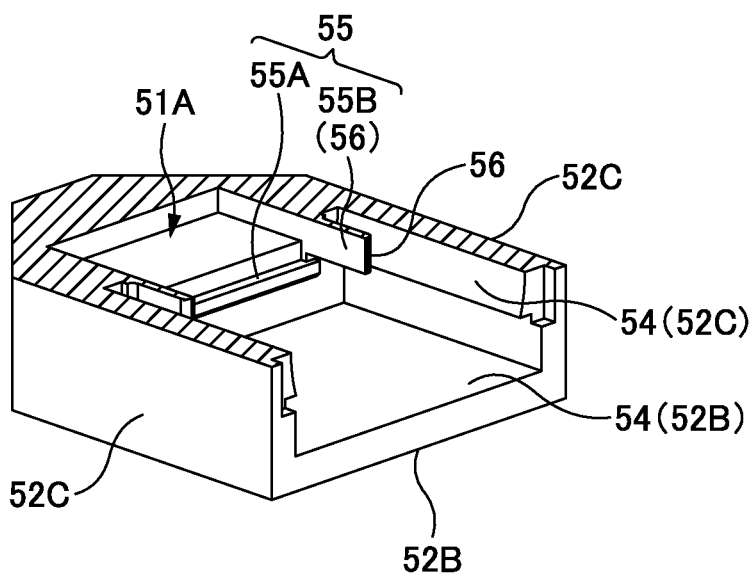
Figure 6A:
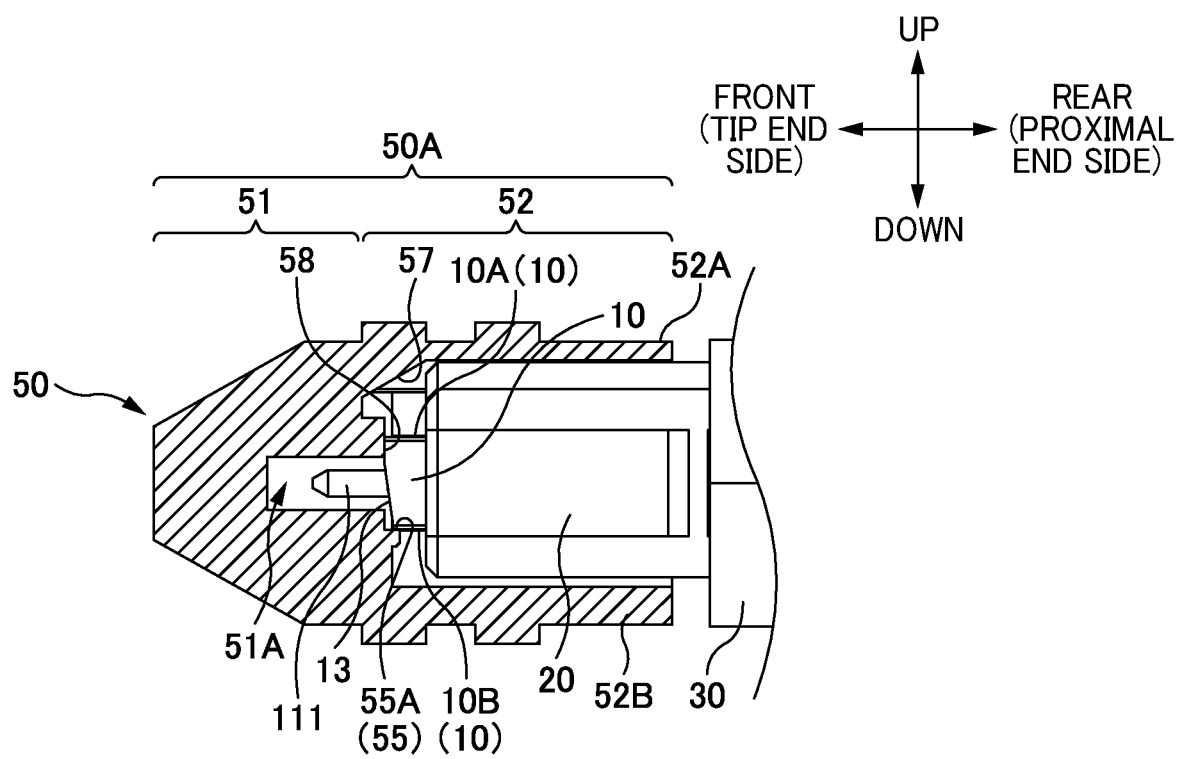
FIGS. 6A and 6B are explanatory views of a state where the cap 50 is attached to the optical connector 1.
Figure 6B:
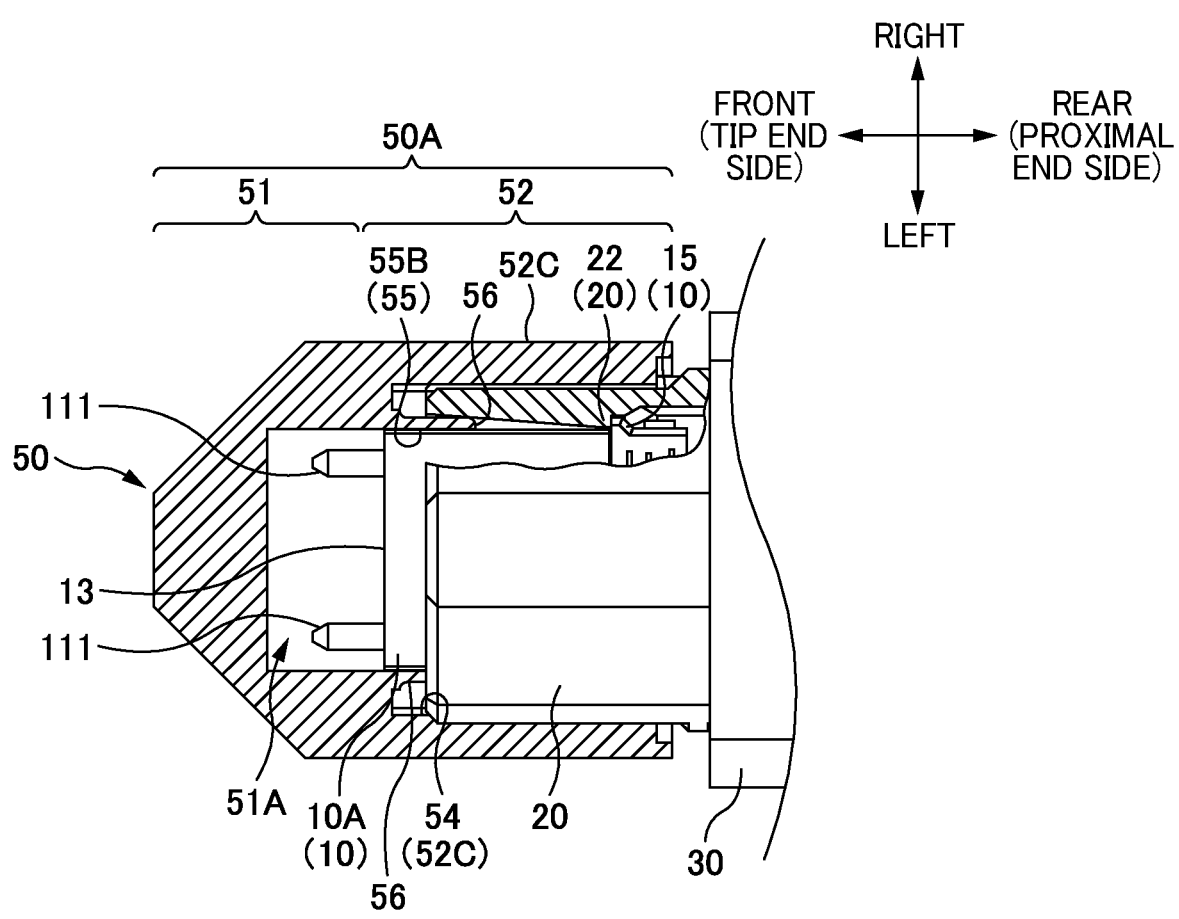

FIG. 3 is a set of orthogonal projections of the cap 50 in several directions. FIG. 4 is a perspective view of the cap 50. FIGS. 5A and 5B are explanatory views illustrating an internal structure of the cap 50. FIGS. 6A and 6B are explanatory views of a state where the cap 50 is attached to the optical connector 1.

The cap 50 is a member that protects the optical connector 1 (optical connector cap). The cap 50 is a member that covers the end face 13 of the ferrule 10 projecting from the housing 20 and the side surfaces of the ferrule 10 projecting from the housing 20. The cap 50 is attachable to and detachable from a tip end part (front part) of the optical connector 1. When the cap 50 is attached to the optical connector 1, the cap 50 covers a tip end part of the ferrule 10 projecting from the opening of the housing 20, thereby protecting the ferrule 10. The cap 50 in one or more embodiments includes a body part 50A, a housing contact part 54, and a ferrule contact part 55.

The body part 50A forms the body of the cap 50. The body part 50A is attachable to the optical connector 1, and covers the end face 13 of the ferrule 10 projecting from the housing 20 and the side surfaces of the ferrule 10 projecting from the housing 20. In one or more embodiments, the cap 50 (body part 50A) has a tip end wall 51 and a side wall 52.

The tip end wall 51 is a part of the cap 50 (body part 50A) on the tip end side (front side) (front wall part). In the tip end wall 51, a recessed part 51A to accommodate the guide pins 111 is located. Locating the recessed part 51A in the cap 50 prevents interference between the cap 50 and the guide pins 111 when the cap 50 is attached to the optical connector 1.

The side wall 52 is a part forming the side surfaces of the cap 50 (body part 50A). The side wall 52 is a part forming the outer periphery of the cap 50, and is a part surrounding the tip end part of the optical connector 1 (surrounding part). The side wall 52 includes an upper wall part 52A, a lower wall part 52B opposed to the upper wall part 52A, and left and right side wall parts 52C linking the upper wall part 52A and the lower wall part 52B. Also, the cap 50 has an accommodation part 53. The accommodation part 53 is a part to accommodate the tip end part of the optical connector 1, and is formed as a space surrounded by the tip end wall 51 and the side wall 52.

The cap 50 in one or more embodiments has the housing contact part 54, the ferrule contact part 55, a slope part 57, and a pushing part 58.

The housing contact part 54 is a part that contacts the housing 20 inside the body part 50A. Herein, the housing contact part 54 is mainly formed of inner surfaces (surfaces on the accommodation part 53 side) of the side wall 52. Note that the configuration of the housing contact part 54 is not limited to this. The cap 50 gets attached to the optical connector 1 by bringing the housing contact part 54 formed of the inner surfaces of the side wall 52 into contact with the outer periphery of the housing 20 (in other words, by fitting the housing contact part 54 into the outer periphery of the housing 20).

The housing contact part 54 may contact the housing 20 with such a fitting force that the cap 50 will slide relative to the housing 20 in response to receiving a predetermined pushing force (corresponding to the pushing force with which the floating mechanism 40 pushes the ferrule 10) from the ferrule 10 in the floating state. In this way, as will be described later, the ferrule 10 can be brought back to the non-floating state (the state where the rim parts 15 of the ferrule 10 and the protrusion parts 22 of the housing 20 are in contact with each other) after the ferrule 10 is brought into the floating state to thereby adjust the position of the ferrule 10. Accordingly, the ferrule 10 is likely to be kept in the appropriate position even after the cap 50 is detached from the optical connector 1.

The ferrule contact part 55 is a part that contacts side surfaces of the ferrule 10. The ferrule contact part 55 contacts the side surfaces of the ferrule 10 when the housing contact part 54 contacts the housing 20 (i.e., when the cap 50 is attached to the optical connector 1). As the ferrule contact part 55 contacts the side surfaces of the ferrule 10, the ferrule contact part 55 pushes the ferrule 10 in predetermined directions, so that the position of the ferrule 10 relative to the housing 20 is appropriately adjusted. In other words, the ferrule contact part 55 serves as a position adjustment part that adjusts the position of the ferrule 10 relative to the housing 20. In one or more embodiments, the ferrule contact part 55 has a shifting contact part 55A and centering contact parts 55B. Note that the ferrule contact part 55 may only have either the shifting contact part 55A or the centering contact parts 55B.

The shifting contact part 55A is a part that contacts the second side surface 10B (the lower surface herein) of the ferrule 10. The shifting contact part 55A is a part that pushes the second side surface 10B in a direction from the second side surface 10B toward the first side surface 10A (the upper surface herein) (a direction from the lower side toward the upper side herein). That is, the shifting contact part 55A is a part that shifts the ferrule 10 toward the protruding side of the end face 13 relative to the housing 20. The shifting contact part 55A is formed as a surface parallel to the front-rear direction and the width direction (a surface perpendicular to the up-down direction). Note that the shifting contact part 55A is not limited to a surface parallel to the front-rear direction and the width direction as long as it can push the second side surface 10B of the ferrule 10 (the lower surface herein). For example, the shifting contact part 55A may be formed as a surface sloped with respect to the front-rear direction or formed as a protruding surface instead of a flat surface. When the cap 50 is attached to the optical connector 1 (when the housing contact part 54 contacts the housing 20), the shifting contact part 55A contacts the second side surface 10B (the lower surface herein) of the ferrule 10 and pushes the second side surface 10B of the ferrule 10 in the direction from the second side surface 10B toward the first side surface 10A (the upper surface herein) (the direction from the lower side toward the upper side herein). This shifts the ferrule 10 toward the protruding side of the end face 13 (the upper side herein) relative to the housing 20. In one or more embodiments, when the optical connector 1 with the cap 50 detached therefrom is connected to the counterpart connector, the ferrule 10 is brought into abutment with the other in the state where the ferrule is offset by an amount close to the offset amount taken into account as illustrated in FIG. 12B. This makes it possible to make the optical axes of the optical fibers coincident with each other (makes it likely that the optical axes coincide with each other), and reduce the transmission loss of optical signals. That is, in one or more embodiments, the position of the ferrule 10 can be adjusted to an appropriate position relative to the housing 20 with the shifting contact part 55A.

Meanwhile, if a keyway 521 is located in each of the upper and lower inner wall surfaces like a conventional cap for an MPO connector (if the cap is formed to be vertically symmetric), the cap 50 and the optical connector 1 may fail to be oriented in the same way in the vertical direction. In this case, when the cap 50 is attached to the optical connector 1, the shifting contact part 55A does not contact the second side surface 10B (lower surface) of the ferrule 10 but contacts the first side surface 10A (upper surface) on the opposite side. In one or more embodiments, however, the keyway 521 is located only in one inner wall surface of the side wall 52 of the cap 50 (body part 50A). That is, in one or more embodiments, the cap 50 (body part 50A) includes only one keyway 521 and has a vertically asymmetric shape. Thus, in one or more embodiments, when the cap 50 is attached to the optical connector 1, the cap 50 and the optical connector 1 can be oriented in the same way in the vertical direction by engaging the key 21 of the optical connector 1 with the keyway 521 of the cap 50. Accordingly, the shifting contact part 55A of the cap 50 can be brought into contact with the second side surface 10B (lower surface) of the ferrule 10.

The centering contact parts 55B are parts that contact the left and right side surfaces of the ferrule 10. The centering contact parts 55B have a pair of opposed surfaces. When the cap 50 is attached to the optical connector 1 (when the housing contact part 54 contacts the housing 20), the ferrule 10 is placed between the pair of opposed surfaces. In this way, the centering contact parts 55B place the ferrule 10 in the center of the housing 20 in the width direction (centers the ferrule 10). Note that, in one or more embodiments, the cap 50 has a symmetric shape in the width direction (bilaterally symmetric shape) since the ferrule 10 is placed in the center of the cap 50 in the width direction when the cap 50 is attached to the optical connector 1. In one or more embodiments, when the optical connector 1 with the cap 50 detached therefrom is connected to the counterpart connector, the ferrules are less likely to be misaligned in the width direction as illustrated in FIG. 11B and connected to each other. This renders the optical axes of the optical fibers coincident with each other and reduces the transmission loss of optical signals. That is, in one or more embodiments, the position of the ferrule 10 can be adjusted to an appropriate position relative to the housing 20 with the centering contact parts 55B.

As illustrated in FIGS. 5B and 6B, the cap 50 in one or more embodiments includes a pair of insertion pieces 56 on the left and right. The insertion pieces 56 are plate-shaped parts to be inserted between the ferrule 10 and the housing 20 (see FIG. 6B). The insertion pieces 56 are cantilevered parts protruding from the tip end wall 51 toward the proximal end side (rear side). The insertion pieces 56 are plate-shaped parts perpendicular to the width direction (left-right direction), and are placed to be spaced from the side wall parts 52C. As illustrated in FIG. 6B, the side walls of the housing 20 are inserted between the insertion pieces 56 and the side wall parts 52C. In one or more embodiments, the inner opposed surfaces of the pair of insertion pieces 56 serve as the centering contact parts 55B (and the outer surfaces of the pair of insertion pieces 56 serve as the housing contact part 54, which contacts the housing 20). Note that the cap 50 does not have to include the insertion pieces 56, and the centering contact parts 55B (ferrule contact part 55) do not have to be located on the insertion pieces 56. Note that, in this case, the centering contact parts 55B contact only the parts of the side surfaces of the ferrule 10 protruding from the opening of the housing 20. Accordingly, the area of contact between the centering contact parts 55B and the ferrule 10 is small. In one or more embodiments, however, the centering contact parts 55B not only contact the parts of the side surfaces of the ferrule 10 protruding from the opening of the housing 20 but also the parts of the side surfaces on the proximal end side from the opening of the housing 20. This increases the area of contact between the centering contact parts 55B and the ferrule 10. Accordingly, the position of the ferrule 10 is more likely to be adjusted to an appropriate position relative to the housing 20.

The slope part 57 is a part having a sloped surface configured to contact the housing 20. The slope part 57 is a part that pushes the housing 20 toward the ferrule 10 from the direction opposite to the direction in which the ferrule contact part 55 (specifically the shifting contact part 55A) pushes the second side surface 10B (the lower surface herein) of the ferrule 10. In one or more embodiments, the slope part 57 pushes the housing 20 from the upper side toward the lower side. As illustrated in FIG. 6A, the slope part 57 is located at an inside corner between the tip end wall 51 and the upper wall part 52A (the side wall 52 where the keyway 521 is located) of the cap 50. The slope part 57 has a sloped surface with a distance between itself and the shifting contact part 55A in the up-down direction narrowing toward the tip end side. Thus, when the cap 50 is further moved toward the proximal end side relative to the optical connector 1 from a state where the cap 50 is attached to the optical connector 1 such that the shifting contact part 55A is in contact with the ferrule 10 and the slope part 57 is in contact with the housing 20, the ferrule 10 and an upper part of the housing 20 become sandwiched between the shifting contact part 55A and the slope part 57 (described later; see FIG. 7C). In this way, the ferrule 10 is likely to shift relative to the housing 20 toward the protruding side of the inclined surface 13 (see FIG. 12B).

In one or more embodiments, the slope part 57 is placed on the tip end side of the keyway 521, and is configured to contact an end part of the key 21 of the housing 20. The slope part 57 is therefore configured to contact the housing 20 in the center of the housing 20 in the width direction and pushing the center of the housing 20 in the width direction toward the ferrule 10. This prevents the housing 20 from tilting in the left-right direction, and makes the housing 20 likely to move straight in the front-rear direction. Note that the slope part 57 may be located at a part other than the tip end of the keyway 521, and the slope part 57 may contact a part of the housing 20 other than the key 21.

The pushing part 58 is a part that pushes the tip end part of the ferrule 10. The pushing part 58 is formed as a surface perpendicular to the front-rear direction. Note that the pushing part 58 may be in another shape as long as it can push the tip end part of the ferrule 10. By pushing the ferrule 10, the pushing part 58 can make the ferrule 10 retract into the housing 20. That is, as the pushing part 58 pushes the ferrule 10, the ferrule 10 shifts to the floating state (the state where the rim parts 15 of the ferrule 10 and the protrusion parts 22 of the housing 20 are separated from each other). When the ferrule 10 is in the floating state, no frictional force acts between the rim parts 15 and the protrusion parts 22. This makes it easier for the ferrule 10 to be moved relative to housing 20 and adjusted to an appropriate position when the ferrule contact part 55 pushes the ferrule 10.

FIGS. 7A to 7D are explanatory views of states inside the cap 50 at the time of attaching the cap. A partial enlarged view is shown to the right of each drawing.

When an operator inserts the tip end part of the optical connector 1 into the accommodation part 53 of the cap 50 in order to attach the cap 50 to the optical connector 1, the shifting contact part 55A faces the second side surface 10B (lower surface) of the ferrule 10, as illustrated in FIG. 7A. At this time, the shifting contact part 55A may contact the second side surface 10B of the ferrule 10. The shifting contact part 55A does not have to contact the second side surface 10B of the ferrule 10 at this stage.

As the operator inserts the tip end part of the optical connector 1 deeper into the accommodation part 53 of the cap 50 from the state illustrated in FIG. 7A, the pushing part 58 comes into contact with the tip end part of the ferrule 10, as illustrated in FIG. 7B. As the operator then inserts the tip end part of the optical connector 1 deeper into the accommodation part 53 of the cap 50 from the state where the pushing part 58 is in contact with the tip end part of the ferrule 10, the ferrule 10 is pushed by the pushing part 58 and retracts into the housing 20 as illustrated in FIG. 7C, so that the ferrule 10 shifts to the floating state (the state where the rim parts 15 of the ferrule 10 and the protrusion parts 22 of the housing 20 are separated from each other, thereby making the ferrule 10 easily movable relative to the housing 20).

Moreover, as the operator inserts the tip end part of the optical connector 1 deeper into the accommodation part 53 of the cap 50 from the state illustrated in FIG. 7B, the slope part 57 comes into contact with the housing 20 (for more information, an end part of the key 21), as illustrated in FIG. 7C. The slope part 57 is configured as a sloped surface with a distance between itself and the shifting contact part 55A in the up-down direction narrowing toward the tip end side. Thus, the farther the housing 20 moves relative to the cap 50 toward the tip end side (the deeper the operator inserts the tip end part of the optical connector 1 into the accommodation part 53 of the cap 50), the deeper the ferrule 10 and an upper part of the housing 20 become sandwiched between the shifting contact part 55A and the slope part 57. Hence, even if the shifting contact part 55A was not in contact with the second side surface 10B of the ferrule 10 at the stage illustrated in FIG. 7A, the shifting contact part 55A can now contact the second side surface 10B of the ferrule 10. Also, as the housing 20 moves relative to the cap 50 toward the tip end side, the shifting contact part 55A pushes the second side surface 10B of the ferrule 10 whereas the slope part 57 pushes the housing 20 toward the ferrule 10 from the direction opposite to the direction in which the shifting contact part 55A pushes the ferrule 10, as illustrated in FIG. 7C. As a result, the ferrule 10 shifts relative to the housing 20 toward the protruding side of the inclined surface 13.

Meanwhile, in one or more embodiments, as illustrated in FIG. 7A, a dimension L1 is set to be shorter than the dimension L2 (L1<L2), where L1 is the dimension of the gap between the pushing part 58 and the proximal end part of the slope part 57 (the part of the slope part 57 which the housing 20 contacts first) in the front-rear direction, and L2 is the dimension of the gap between the tip end part of the ferrule 10 (the part which contacts the pushing part 58) and the tip end part of the upper surface of the housing 20 (the part which contacts the slope part 57; the end part of the key 21) in the front-rear direction. Note that the dimension L2 substantially corresponds to the amount of projection of the ferrule 10 from the opening of the housing 20. Since the dimension L1 is set to be shorter than the dimension L2, the slope part 57 is in a state of not contacting the housing 20 (the slope part 57 is in a state of not pushing the housing 20) at the stage where the pushing part 58 and the tip end part of the ferrule 10 contact each other (see FIG. 7B). Also, at the stage where the slope part 57 contacts the housing 20, the pushing part 58 is in a state of pushing the ferrule 10, so that the ferrule 10 is in the floating state, since the dimension L1 is set to be shorter than the dimension L2. That is, in one or more embodiments, the dimension L1 is set to be shorter than the dimension L2 to thereby let the slope part 57 contact the housing 20 (specifically the end part of the key 21) after the pushing part 58 pushes the ferrule 10 into the floating state. This enables the position of the ferrule 10 to be adjusted in a state where the ferrule 10 has become easily movable relative to the housing 20.

Note that the shifting contact part 55A may contact the second side surface 10B of the ferrule 10 and the slope part 57 may contact the housing 20 (specifically the end part of the key 21) when the ferrule 10 is in the non-floating state (i.e., the state where the rim parts 15 of the ferrule 10 and the protrusion parts 22 of the housing 20 are in contact with each other). In this case, however, since the rim parts 15 of the ferrule 10 and the protrusion parts 22 of the housing 20 are in contact with each other, it is more difficult for the ferrule 10 to move relative to the housing 20 than in one or more embodiments due to the frictional force acting between the rim parts 15 and the protrusion parts 22. Hence, the slope part 57 may contact the housing 20 (specifically the end part of the key 21) and the shifting contact part 55A may contact the second side surface 10B of the ferrule 10 after the ferrule 10 shifts to the floating state, as in one or more embodiments. That is, the dimension L1 may be shorter than the dimension L2, as in one or more embodiments.

After attaching the cap 50 to the optical connector 1, the operator releases his or her fingers from the cap 50. Once the operator's fingers are released from the cap 50, the cap 50 receives a pushing force from the ferrule 10 in the floating state which originates from the force of pushing the ferrule 10 toward the tip end side from the floating mechanism 40. As a result, the cap 50 moves (slides) relative to the housing 20 toward the tip end side to thereby transition from the state illustrated in FIG. 7C to the state illustrated in FIG. 7D. With the movement of the cap 50, the ferrule 10 shifts from the floating state to the non-floating state (the state where the rim parts 15 of the ferrule 10 and the protrusion parts 22 of the housing 20 are in contact with each other).

In the state illustrated in FIG. 7D, it is easier to maintain the position of the ferrule 10 relative to the housing 20 since the rim parts 15 of the ferrule 10 and the protrusion parts 22 of the housing 20 are in contact with each other. Note that, if the ferrule 10 remains in the floating state while the cap 50 is attached, and is left with the cap 50 attached, the position of the ferrule 10 relative to the housing 20 may be misaligned by contact or impact. In one or more embodiments, however, the ferrule 10 is brought back to the non-floating state (the state where the rim parts 15 of the ferrule 10 and the protrusion parts 22 of the housing 20 are in contact with each other) after bringing the ferrule 10 into the floating state and adjusting the position of the ferrule 10. In this way, the position of the ferrule 10 relative to the housing 20 will not be easily misaligned by contact or impact when the ferrule 10 is left with the cap 50 attached. Accordingly, in one or more embodiments, the ferrule 10 is likely to remain in the appropriate position even after the cap 50 is detached from the optical connector 1.

After the cap 50 is detached from the optical connector 1, the optical connector 1 is connected to the counterpart connector. In one or more embodiments, the position of the ferrule 10 is adjusted to an appropriate position when the cap 50 is attached. Thus, when the optical connector 1 is connected to the counterpart connector, the optical axes of the optical fibers to be connected to each other are prevented from being misaligned. This reduces the transmission loss of optical signals.

Second Embodiments

Figure 8:
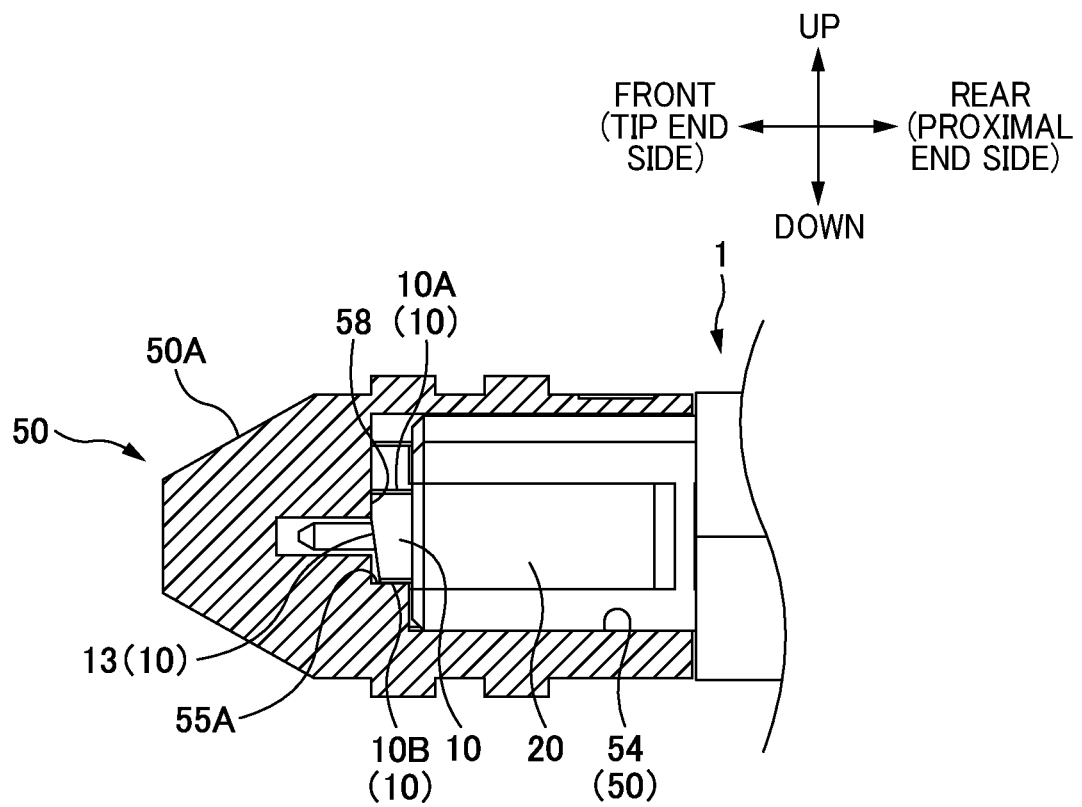
FIG. 8 is an explanatory view of a state where a cap 50 in second embodiments is attached to an optical connector 1.

FIG. 8 is an explanatory view of a state where a cap 50 in second embodiments is attached to an optical connector 1. Also in the second embodiments, the cap 50 has a body part 50A, a housing contact part 54, and a ferrule contact part 55.

Also in the second embodiments, an end face 13 of a ferrule 10 is inclined such that, of the side surfaces of the ferrule 10, the upper surface (first side surface 10A) protrudes from the housing 20 more than the lower surface (the surface opposite to the upper surface; second side surface 10B). Also in the second embodiments, the ferrule contact part 55 has a shifting contact part 55A. The shifting contact part 55A contacts the second side surface 10B of the ferrule 10 and pushes the second side surface 10B in a direction from the second side surface 10B toward the first side surface 10A (the upper surface herein) (a direction from the lower side toward the upper side herein). Thus, also in the second embodiments, the ferrule 10 is shifted toward the protruding side of the end face 13 (the upper side herein) relative to the housing 20, and the position of the ferrule 10 is adjusted to an appropriate position relative to the housing 20. Moreover, as a result of this, when the optical connector 1 with the cap 50 detached therefrom is connected to a counterpart connector, the optical axes of the optical fibers coincide with each other. This reduces the transmission loss of optical signals.

The cap 50 in the second embodiments does not include the slope part 57. Here, although the cap 50 does not include the slope part 57, the ferrule contact part 55 contacts a side surface of the ferrule 10 (the second side surface 10B herein), as illustrated in FIG. 8. Thus, the ferrule 10 is shifted toward the protruding side of the end face 13 (the upper side herein) relative to the housing 20, and the position of the ferrule 10 is adjusted to an appropriate position relative to the housing 20.

The ferrule contact part 55 does not have to include the centering contact parts 55B. When the cap 50 does not include the centering contact parts 55B, the position of the ferrule 10 in the width direction cannot be adjusted by attaching the cap 50 to the optical connector 1. Nonetheless, the position of the ferrule 10 in the up-down direction can be adjusted since the ferrule contact part 55 has the shifting contact part 55A. Note that, in the second embodiments too, the ferrule contact part 55 may include the centering contact parts 55B.

Third Embodiments

Figure 9:
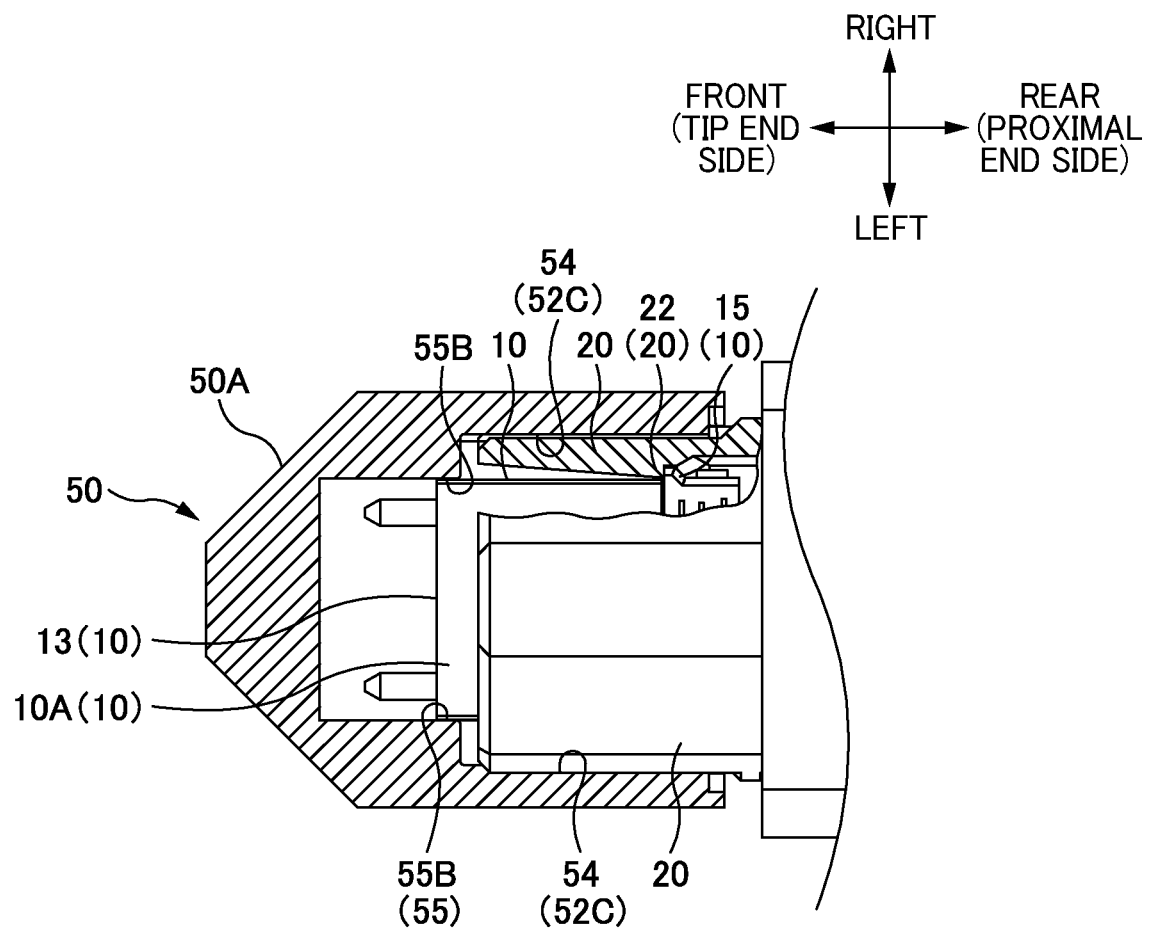
FIG. 9 is an explanatory view of a state where a cap 50 in third embodiments is attached to an optical connector 1.

FIG. 9 is an explanatory view of a state where a cap 50 in third embodiments is attached to an optical connector 1.

In the third embodiments too, the cap 50 has a body part 50A, a housing contact part 54, and a ferrule contact part 55.

In the third embodiments, the ferrule contact part 55 has centering contact parts 55B. As in the first embodiments, the centering contact parts 55B in the third embodiments have a pair of opposed surfaces and, as illustrated in FIG. 9, a ferrule 10 is placed between the pair of opposed surfaces when the cap 50 is attached to the optical connector 1 (when the housing contact part 54 contacts the housing 20). Thus, also in the third embodiments, the ferrule 10 is placed in the center of the housing 20 (centered) in the width direction, and the position of the ferrule 10 is adjusted to an appropriate position relative to the housing 20. Moreover, as a result of this, when the optical connector 1 with the cap 50 detached therefrom is connected to a counterpart connector, the optical axes of the optical fibers coincide with each other. This reduces the transmission loss of optical signals.

Note that, in the third embodiments, the cap 50 does not include the insertion pieces 56, which are inserted between the ferrule 10 and the housing 20. For this reason, in the third embodiments, the pair of opposed surfaces of the left and right side wall parts 52C in the side wall 52 of the cap 50 serve as the ferrule contact part 55 (specifically the centering contact parts 55B). As described above, the cap 50 does not have to include the insertion pieces 56, and the centering contact parts 55B (ferrule contact part 55) do not have to be located on the insertion pieces 56.

In the third embodiments, an end face 13 of the ferrule 10 is formed as a surface that is not inclined and is perpendicular to the optical axes of the optical fibers. When the end face 13 is not inclined as above, the ferrule contact part 55 does not have to include the shifting contact part 55A. Note that, even when the end face 13 of the ferrule 10 is inclined, the ferrule contact part 55 does not have to include the shifting contact part 55A and may include only the centering contact parts 55B.

Fourth Embodiments

Figure 10A:
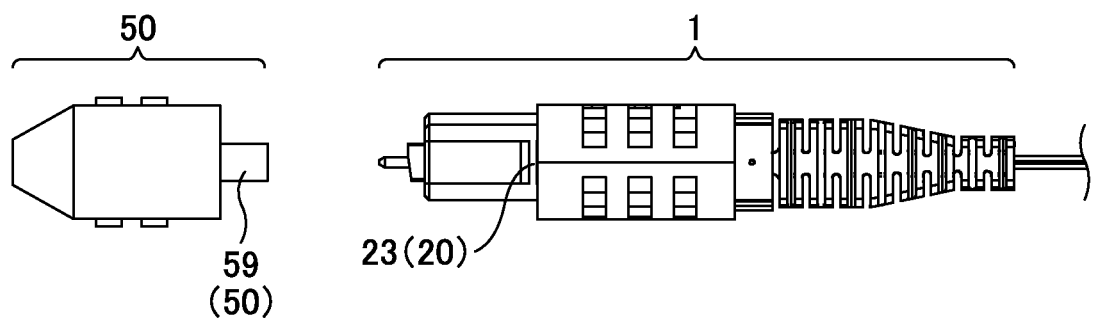
FIGS. 10A and 10B are explanatory views of a cap 50 in fourth embodiments.
Figure 10B:
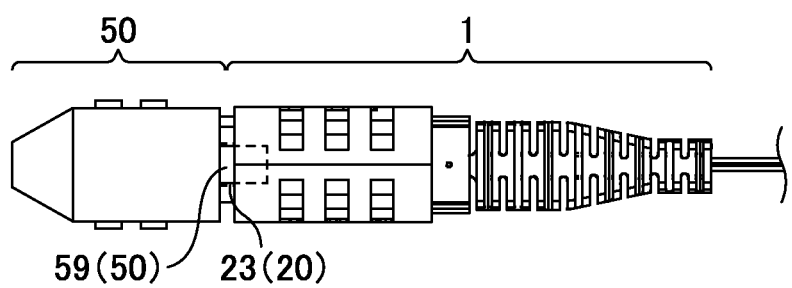

FIGS. 10A and 10B are explanatory views of a cap 50 in fourth embodiments. The cap 50 in the fourth embodiments includes a body part 50A, and a housing contact part 54 and a ferrule contact part 55 not illustrated.

The housing contact part 54 in the fourth embodiments has latch parts 59. The latch parts 59 are claw-shaped parts to be hooked on engagement parts 23 of a housing 20. In the fourth embodiments, the cap 50 is prevented from being detached and falling off by hooking the latch parts 59 on the engagement parts 23 of the housing 20.

Other Embodiments

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 optical connector
10 ferrule
10A first side surface
10B second side surface
11 guide hole
111 guide pin
12 fiber hole
13 end face
14 body part
15 rim part
17 pin clamp
20 housing
21 key
22 protrusion part
23 engagement part
24 window part
30 coupling
31 spring
40 floating mechanism
41 spring
42 spring push
421 arm part
421A claw part
43 boot
50 cap
50A body part
51 tip end wall
51A recessed part
52 side wall
52A upper wall part
52B lower wall part
52C side wall part
521 keyway
53 accommodation part
54 housing contact part
55 ferrule contact part
55A shifting contact part
55B centering contact part
56 insertion piece
57 slope part
58 pushing part
59 latch part
100 capped optical connector

The invention claimed is:

1. A cap attachable to an optical connector including a ferrule and a housing that slidably houses the ferrule, the cap comprising:
   a body part configured to attach to the optical connector and configured to cover a connecting end face of the ferrule projecting from the housing and a side surface of the ferrule projecting from the housing;
   a housing contact part configured to contact the housing inside the body part; and
   a ferrule contact part configured to contact the side surface of the ferrule in a state where the housing contact part is in contact with the housing, wherein
   the connecting end face of the ferrule is inclined such that a first side surface in the side surface of the ferrule protrudes from the housing more than a second side surface on an opposite side to the first side surface protrudes from the housing, and
   the ferrule contact part is configured to:
       contact the second side surface, and
       push the second side surface in a direction from the second side surface toward the first side surface.

2. The cap according to claim 1, further comprising:
   a slope part that:
       comprises a sloped surface configured to contact the housing, and is configured to push the housing toward the ferrule from a direction opposite to the direction in which the ferrule contact part pushes the second side surface.

3. The cap according to claim 2, further comprising:
a pushing part configured to push a tip end part of the ferrule, wherein
in a state where the pushing part pushes the tip end part of the ferrule:
   the ferrule contact part is configured to push the second side surface, and
   the slope part is configured to push the housing toward the ferrule from the direction opposite to the direction in which the ferrule contact part pushes the second side surface.

4. The cap according to claim 3, wherein L1 is shorter than L2, where
L1 is a dimension of a gap between the pushing part and a proximal end part of the slope part in a cap attaching/detaching direction, and
L2 is a dimension of a gap between the tip end part of the ferrule and a tip end part of the housing in the cap attaching/detaching direction.

5. The cap according to claim 2, wherein an inner wall surface of the cap comprises a keyway configured to be engaged with a key of the optical connector.

6. The cap according to claim 1, wherein
the ferrule contact part comprises a pair of opposed surfaces opposed to each other in a width direction of the ferrule, and
the ferrule is disposed between the pair of the opposed surfaces in a state where the housing contact part is in contact with the housing.

7. The cap according to claim 6, further comprising:
insertion pieces configured to be inserted between the ferrule and the housing, wherein
the opposed surfaces are disposed on the insertion pieces.

* * * * *